United States Patent [19]

Peterson

[11] 4,256,354
[45] Mar. 17, 1981

[54] LAMINATED BEARING STRUCTURES

[75] Inventor: Robert R. Peterson, Hudson, Mass.

[73] Assignee: Barry Wright Corporation, Watertown, Mass.

[21] Appl. No.: 67,993

[22] Filed: Aug. 20, 1979

Related U.S. Application Data

[63] Continuation-in-part of Ser. No. 17,823, Mar. 5, 1979.

[51] Int. Cl.³ .................. F16C 27/08; F16C 17/10
[52] U.S. Cl. ............................. 308/139; 308/2 A; 308/26; 308/37
[58] Field of Search ............... 308/139, 26, 2 R, 2 A, 308/163, 164, 237 R, DIG. 8, 37; 267/152, 57.1 R

[56] References Cited
U.S. PATENT DOCUMENTS

| | | | |
|---|---|---|---|
| 3,679,197 | 7/1972 | Schmidt | 267/152 |
| 3,941,433 | 3/1976 | Dolling et al. | 308/DIG. 8 |
| 4,040,690 | 8/1977 | Finney | 308/26 |
| 4,105,266 | 8/1978 | Finney | 308/26 |

Primary Examiner—Lenard A. Footland
Attorney, Agent, or Firm—Milton E. Gilbert

[57] ABSTRACT

A frusto-conical laminated elastomeric bearing is provided wherein at least some of the layers are graded in composition so that they have a first relatively high modulus of elasticity at the inner circumstance, a second lower but still relatively high modulus of elasticity at the outer circumference, and a third still lower modulus of elasticity in an intermediate position between the inner and outer circumferences, with the grading being arranged so as to provide an optimum balance of strain distribution and spring rates consistent with bearing lifetime and reduced-torque considerations.

8 Claims, 1 Drawing Figure

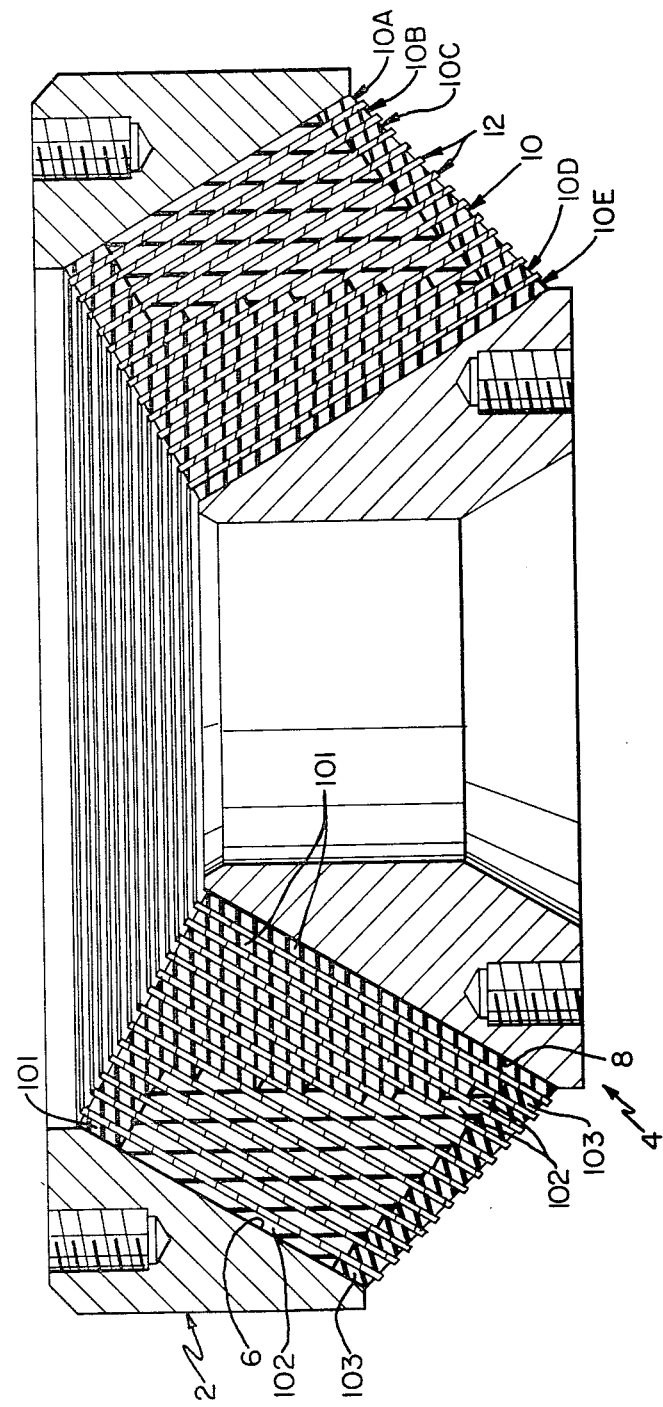

LAMINATED BEARING STRUCTURES

This is a continuation-in-part of copending application Ser. No. 17,823, filed Mar. 5, 1979 for Laminated Bearing Structures.

BACKGROUND OF THE INVENTION

This invention relates to compressive load carrying bearings and more particularly to laminated bearings of the type comprising alternating bonded layers of a resilient material such as an elastomer and a non-extensible material such as a metal.

It is well known that the compressive load carrying ability of a given thickness of an elastomer material may be increased many times by subdividing it into a plurality of layers and separating the layers by intervening layers of a non-extensible material. At the same time, however, the ability of the resilient material to yield in shear or torsion in a direction parallel to the layers is substantially unaffected. This concept has been adopted or utilized in the design of different forms of laminated bearings, as exemplified by the following U.S. Patents: Dolling, No. 3,941,433; Lee et al, No. 3,429,622; Schmidt, No. 3,679,197; Boggs, No. 3,377,110; Krotz, No. 3,179,400; Orain, No. 2,995,907; Hinks, No. 2,900,182; and Wildhaber, No. 2,752,766, and the prior art cited therein. Laminated elastomeric bearings of various types are commonly used in commercial applications where it is necessary to carry large compressive loads in a first direction and also to accommodate limited relative movement in other directions. The bearings are designed so that the large compressive loads are carried generally perpendicular to the resilient lamellae. A significant commercial variety of bearings is characterized by the alternating bonded lamellae being disposed concentrically about a common center, i.e., so that successive alternating layers of resilient and nonextensible materials are disposed at successively greater radial distances from the common center. This variety of bearings includes a number of different configurations, notably bearings which are cylindrical, conical or generally spherical in shape or which are essentially sectors of cylinders, cones and spheres.

Conically-shaped laminated bearings may be used for a variety of applications, but have achieved particular importance in helicopters where they are employed as main bearings for the blade shafts of the main rotor. In the typical helicopter application, the conically-shaped bearing is required to accommodate cyclic torsional motion about a given axis while simultaneously carrying a large compressive load along that axis, and radial loads along an axis perpendicular to the bearing center line. The result is that greater compressive stresses and shear stresses and strains are established in the resilient layers closest to the common center and failure from fatigue encountered in accommodating the torsional motion tends to occur at the innermost resilient layer.

For the usual laminated bearing application it is desirable, if not essential, to have a bearing design which provides an optimum combination of load-carrying capability, spring rate and strain distribution consistent with cost and life expectancy considerations. A bearing of conical geometry employed in a helicopter main rotor retention system is required to undergo dynamic and static torsional deflection as well as dynamic and static compressive loading. The bearing experiences shear strain produced from torsional deflections about the bearing center line. This torsional sheat strain is not uniformly distributed and will vary in distribution as a function of the magnitude of torsional deflection. Additionally shear strains are induced by application of compressive loads (either axial or radial) and these shear strains are maximum at the edges of the elastomer layers located along the apex (the inner circumference) of the bearing. The edges of the elastomer layers tend to bulge from between the adjacent non-extensible laminations under compressive loading, thereby exposing more of those layers to wear. The wear on the elastomeric layers tends to be much greater at their inner (apex) edges than elsewhere due to the higher strain levels in the apex region, with the result that the bearing will usually fail due to extrusion and fatigue of the elastomer layers at their inner edges. Of course the tendency to bulge can be reduced by making the elastomer layers of a material having a greater modulus of elasticity. However, increasing the modulus will increase the torsional, radial and axial spring rates of the bearing. In the typical helicopter application, increasing the spring rate may not be acceptable since it may result in the need for a concomitant increase in the power capability (and/or a decrease in the useful life) of the actuator or other device which is coupled to the bearing. Furthermore, the bulging problem at the outer circumference of the bearing may not be sufficiently severe due to the lower level of compressive load-induced strain as to require any increase in modulus. On the other hand an increase in modulus may increase the torsional spring rate at the outer circumference beyond acceptable limits. In this connection it should be noted that, on the basis of computer finite element analysis of the elastomer layers, increasing the modulus of an elastomer layer will produce a greater contribution to the torsional spring rate of an element of the layer located at its base end than an element of the same length located at its apex end, due to the difference between the effective radii of such elements. Hence merely changing the modulus of each layer to reduce the compression-induced strains at the apex side of the bearing usually is not a practical solution since it makes it difficult to achieve an optimum combination of compression-induced edge shear strain, torsional shear strain distribution and lowest possible torsional spring rate consistant with the cost, lifetime and operating requirements of the system in which the bearing is mounted.

It has been recognized that absolute uniformity of compression induced shear strains within a layer is impossible to achieve because the strains decrease from some finite value at each of its exposed edges to zero at some point intermediate those edges. Nevertheless the more uniform the compression induced shear strains become within each elastomer layer between its edges, the less likely that one layer will fail a substantial time before the other layers. The same is true if the strains in adjacent layers are made more nearly the same at corresponding points. In this connection it is to be noted that because of differences between the average radius of the layers of a conical bearing, the compressionally-induced and torsionally-induced shear strains may tend to vary substantially on a layer-to-layer basis where all of the elastomer layers have the same modulus of elasticity and thickness.

Schmidt, supra, proposed to improve the fatigue life of bearings by progressively increasing the thicknesses of successive layers of resilient material with increasing radius and simultaneously to progressively decrease the modulus of elasticity of those same layers with increasing radius. However, the Schmidt technique is expensive in that it requires that each elastomer layer be made of a different material. Thus, an elastomeric bearing consisting of fifteen resilient layers necessitates provision of fifteen different elastomer materials. Even though this may be achieved by subdividing a basic elastomer feedstock into fifteen lots and modifying each lot with a different amount or type of additive, the fact remains that it is costly, time consuming and inconvenient to provide a different material for each resilient layer. Furthermore, care must be taken to assure that the materials are properly identified so that they will be correctly arranged with modulus of elasticity decreasing with increasing radius as prescribed by Schmidt.

SUMMARY OF THE INVENTION

The primary object of this invention is to provide a method of making laminated bearings of the type described whereby a relatively large number of resilient layers each exhibiting a different effective modulus of elasticity may be provided using three different resilient stocks.

Another object is to improve the fatigue life of laminated bearings and in particular to provide an elastomeric bearing which not only combines a low shear to allowable compressive load ratio but also has an improved fatigue life due to use of higher modulus materials in sections of the resilient layers which tend to have larger strains.

A further object is to provide a bearing in which at least some elastomeric layers have radially-varying moudlii of elasticity that tend to minimize variations between compression induced shear strains at the inner and outer circumference of each layer.

Still another object is to provide a bearing having elastomer layers of constant thickness which are formed so as to equalize strains due to torsion from layer-to-layer, thus assuring a more uniform deterioration of the layers under cyclic torsional motion.

Other more specific objects are to reduce the problem of uneven compression-induced shear strain distribution in each layer of a laminated bearing while allowing low values of torsional spring rate and high loading capacity to be obtained, permit optimization of strain distributions produced by torsional deflections about the bearing center axis, minimize the impact on torsional strain distribution produced from changing the torsional dynamic strain input, and avoid having to use (as required by Schmidt, supra) a large number of different elastomer stocks to optimize strain distribution.

The foregoing objects are obtained by providing as a preferred embodiment of the invention a frusto-conical or conical laminated bearing of the type described wherein at least some of the elastomeric layers are graded in composition so that they have a first high modulus of elasticity at the apex (inner circumference) side of the bearing to restrain bulging, a second lower modulus of elasticity at the base (outer circumference) side of the bearing in accordance with the less pronounced bulging at that side, and a third still lower modulus of elasticity intermediate the apex and base sides, with the grading in composition being arranged so that an optimum combination of compression-induced shear strain, torsional shear strain distribution, and lowest possible spring rates consistent with life-time consideration is obtained.

This grading is achieved by forming the elastomeric-layers so that they consist of three sections of elastomeric material laid up side by side, with the two end sections having a higher modulus of elasticity than the intermediate section so that they serve as bulge restrainers or dams for the softer stock intermediate section. The intermediate section coacts with the end sections to provide a composite modulus of selected value calculated to keep the torsional (shear) stiffness at a low value while permitting a high compressive load stiffness.

Other objects and features of the invention are described or rendered obvious by the following detailed description of a preferred embodiment of the invention and the accompanying drawing.

DESCRIPTION OF THE DRAWING

The drawing is a longitudinal sectional view of the components of a frusto-conical bearing assembly made in accordance with this invention as the components appear prior to molding and the bonding of the resilient materials to the associated metal parts. In the drawing like reference numerals are used to designate like parts.

SPECIFIC DESCRIPTION OF THE INVENTION

In its broadest sense the invention utilizes three elastomeric stocks, the first of relatively high modulus, the second of relatively low modulus, and the third of a modulus greater than the second, suitably arranged and proportioned, within most or all of the elastomeric layers of a laminated bearing so as to more nearly equalize strain distribution on a layer-to-layer basis as well as providing in each layer an optimum balance of strain distribution, bulging and spring rate. The number of layers employing three different elastomer stocks and the relative widths of the elastomer stocks in each multi-stock layer, may vary acccording to the size and shape of the bearing, the modulus of elasticity of the elastomeric-materials used, and the loads to which the bearing is subjected. Preferably, however, in each multi-stock layer the width of the elastomer stock located at the outer circumference is maintained relatively small and substantially constant in keeping with its dual function of (1) serving as a dam to restrict bulging at the outer circumference of the adjacent relatively low modulus material, and (2) having a minimum effect on torsional spring rate. It also is contemplated that some of the sections of relatively high modulus elastomer stock located at the inner circumference may have substantially identical widths, as, for example, in the outermost layers where the effective modulii of the layers can be more nearly the same since the strain distribution is less troublesome on a layer-to-layer basis at the outer circumference of the bearing.

In this connection it is to be appreciated that the modulii of elasticity of different stocks of elastomer or of different portions of an individual elastomeric layer may be affected by the use of elastomeric filler material in the fabrication of a bearing. For example, in one method of fabricating a laminated elastomeric bearing, the elastomeric layers are cut from sheets of elastomer and stacked up by hand with the layers of nonextensible materials. As heat and pressure are applied to bond the elastomeric and nonextensible laminations together, elastomer that has a modulus of elasticity different than the modulii of the elastomers in the layers may be introduced into the mold for the bearing to develop molding pressure, to fill in gaps, and to bring the elastomeric layers to full size. This transfer or filler elastomeric material may mix with the basic elastomer stocks in the layers, thereby altering their moduli of elasticity, or the filler material may form a thin layer along one or both circumferential surfaces of an annular bearing. To distinguish between (a) the modulus of elasticity of a basic elastomeric stock in a layer of elastomer, or the effective combined modulus of several different modulii basic stocks in a layer, and (b) the modulus of elasticity of the same basic stock(s) when mixed with small amounts of filler material or of the filler material itself when forming a relatively thin or narrow surface coating on the layer of basic elastomer stock(s), the modulus of elasticity of a basic stock of elastomer used in a layer of elastomer and the effective combined modulus of two or three different modulii basic stocks in a layer, is termed herein the "nominal" modulus of elasticity of the stock(s). The addition of small amounts of filler material is presumed not to affect the nominal modulus of elasticity to a significant extent (i.e. in a way that would defeat the purpose of the present invention). Similarly, the presence of a thin coating of a filler elastomer on a layer of a basic elastomeric stock is to be ignored. Typically, filler or transfer material will compose about 15% or less of the volume of an elastomeric layer in a laminated elastomeric bearing.

The drawing illustrates a particular embodiment of a frustro-conical laminated bearing suitable and intended for use as a bearing in a helicopter main rotor retention system. The bearing is made by providing two annular rigid metal end members 2 and 4 which have frusto-conical inner and outer surfaces 6 and 8 respectively. In the completed bearing alternating bonded layers of a resilient material 10 and a non-extensible material 12 are disposed between end members 2 and 4, with surfaces 6 and 8 of the latter bonded to a layer of resilient material. The bearing has fourteen layers of resilient material. The resilient material preferably is an elastomer such as a natural or synthetic rubber, but it also may be a suitable plastic material of elastomeric character. The non-extensible material may be steel, but it may be another kind of non-extensible material such as another metal (e.g. aluminum or titanium) or sheets of fiberglass or reinforced plastic. As is evident from the drawing, the layers 10 and 12 are frustro-conical in shape and extend generally parallel to and coaxial with the surfaces 6 and 8 of the two rigid metal end members.

The layers 10 and 12 are of uniform thickness, and the non-extensible layers 12 (which are commonly called shims) are thinner than the resilient layers. If desired, the shims may be as thick or thicker than the resilient layers. Additionally at least some of the resilient layers are made so that they have greater stiffness at their opposite ends than at their midpoints and so that a more uniform strain distribution is obtained in each layer and also on a layer-to-layer basis. This is achieved by making a selected number of the resilient layers 10 from three different resilient stocks arranged in the manner illustrated in the drawing.

Referring to the drawing, the first or outermost resilient layer 10A is made up by laying onto the inner surface 6 of end member 2 three elastomeric stocks represented as frusto-conical sections 101, 102 and 103, with section 101 being an elastomeric material having a selected relatively high modulus of elasticity, section 102 being an elastomeric material having a selected relatively low modulus of elasticity, and section 103 being an elastomeric material having a modulus of elasticity which is intermediate the modulii of sections 101 and 102. The sections are applied so that they abut one another as shown. Then a shim 12 is placed over this composite layer and the second three-section layer 10B is applied over that shim. Depending upon the required characteristics of the bearing, the second layer and subsequent layers as well, may but need not have an overall width equal to the first layer 10A, and the widths of the sections 101 and 102 of the second and succeeding layers may be equal to or differ from the corresponding section of layer 10A. As used in this context, the term "width" refers to the dimension extending parallel to the shims 12 as shown in the drawing.

The third elastomeric layer 10C is prepared in the same way by first placing a second shim over the second composite layer and then laying a three-section composite layer over the second shim. The process of building up alternating elastomeric and non-extensive layers is repeated for successive layers with the relative sizes of the sections 101, 102 and 103 being appropriately proportioned in accordance with the purposes of the invention. In the illustrated embodiment all but the two innermost elastomer layers 10D and 10E are made up of different modulii stocks in the form of sections 101, 102 and 103. The innermost layer 10E consists of only one stock 101, while the next innermost layer 10D is made up of only the stocks 101 and 103.

After the desired number of resilient layers has been laid up, the other end member 4 is engaged with the last resilient layer 10E and then the assembled parts are forced together in a mold under suitable heat and pressure so as to cause the sections of each multi-section elastomer layer to bond to each other and also cause the elastomer layers to bond to the adjacent shims 12 or end members 2 or 4, as the case may be. In the completed bearing each group of resilient sections 101, 102 and 103 is integrated to form a single resilient layer.

In the molding of the layers, additional elastomer material may be introduced into the mold for the bearing for the purpose of developing sufficient molding pressure, to fill in whatever gaps may exist between the various sections of elastomeric material, and to bring the elastomeric layers to full size. This filler or transfer elastomeric material preferably has a modulus of elasticity equal to the modulus of elasticity of the sections 102, but a larger or smaller modulus elastomeric material also may be used. In any event, as noted previously, this filler or transfer material will comprise about 15% or less of the volume of each elastomeric layer in the bearing.

The method of manufacturing described above is especially suitable where the resilient stock is an elastomer which can be fused and molded under heat and pressure. Where the resilient stock is a rubber, the bonding stop involves vulcanization. Other aspects of the procedure of assembling and bonding the array of resilient layers, metal shims and the bearing members 2 and 4 are well known to persons skilled in the art of making laminated elastomeric bearings and are not described herein in detail since they are old and form no part of this invention.

As noted previously, the sections 101, 102 and 103 are suitably arranged and proportioned in order to equalize strain distribution and provide an optimum balance of strain distribution bulging and spring rate. A relatively high modulus stock in the form of sections 101 is used at the apex or inner circumference of the bearing in order to restrain bulging at the inner edge of the bearing, since wear and shear strains induced from compression are historically highest at that edge. On the other hand, the need for bulge restriction is not as severe at the base or outer circumference of the bearing. Consequently use of a lower modulus stock 103 in that region of the bearing is feasible and also desirable since it avoids an unnecessary and disadvantageous increase in spring rate at the outer circumference of the bearing. Using a still lower modulus stock 102 between the other two stocks offers the advantage of allowing relatively wide adjustments in the composite modulus of elasticity of each elastomer layer and also the strain distribution. Preferably as in the illustrated embodiment, the widths of elastomer layers 10 and shims 12 decrease with increasing distance from the center axis of the bearing. However, the layers may have the same width. In the bearing shown in the drawing, the sections 103 have the same width in each layer with the exception of the single stock layer 10E. Preferably sections 103 are made only wide enough to function effectively as dams for the relatively low stiffness stock 102, although they may be made wider if desired. The sections 101 are substantially identical in width in the five outermost layers, but increase progressively in size in each succeeding layer. The sections 102 are substantially identical in width in the five outermost layers and then decrease progressively in size in each succeeding layer. Thus, layer 10D has only a small section 102 and comprises mostly the section 101.

Obviously the foregoing arrangement is not the only possible way of practicing the invention since the relative proportions of the sections 101, 102 and 103 as well as the total number of layers and the number of three, two and one-section layers will depend on the size and anticipated operating conditions of the bearing and the modulii of the stocks used to make the elastomeric layers.

The relative dimensions of the sections 101, 102 and 103 of the elastomeric layers 10 may be determined by computer finite element analysis using a program derived from the finite element program TEX-GAP described in U.S. Pat. No. 4,105,266.

By way of example, a conical bearing having 14 elastomeric layers may be constructed according to the present invention where the elastomer layers and the intervening metal shims have thicknesses of 0.06 and 0.02 respectively and the sections of the individual elastomer layers have widths in inches arranged as follows:

| LAYER NO. | SECTION 101 | SECTION 102 | SECTION 103 |
| --- | --- | --- | --- |
| 1 (10A) | .30 | 1.825 | .30 |
| 2 (10B) | .30 | 1.839 | .30 |
| 3 (10C) | .30 | 1.854 | .30 |
| 4 | .30 | 1.870 | .30 |
| 5 | .30 | 1.885 | .30 |
| 6 | .60 | 1.601 | .30 |
| 7 | .95 | 1.266 | .30 |
| 8 | 1.382 | .85 | .30 |
| 9 | 1.547 | .70 | .30 |
| 10 | 1.763 | .50 | .30 |
| 11 | 1.978 | .30 | .30 |
| 12 | 2.144 | .15 | .30 |
| 13 (10D) | 2.309 | 0.0 | .30 |
| 14 (10E) | 2.630 | 0.0 | 0.0 |

In the foregoing bearing, the sections 101 are made of a material having a shear modulus of elasticity of 240 psi, sections 102 have a shear modulus of elasticity of 70 psi and sections 103 have a shear modulus of elasticity equal to 180 psi. The foregoing values are for nominal modulii of elasticity and each of the materials forming the sections 101, 102 and 103 are essentially the same elastomer with the differences in modulii being achieved by varying the amount of carbon which is added to the elastomeric material. Inner surface 6 of outer member 2 of the bearing has a diameter of 2.062 at one end and 4.486 at the other end, and the outer surface 8 of inner bearing member 4 has a diameter of 0.170 at one end 2.800 at the other end.

A bearing constructed according to the foregoing example will have an overall axial spring stiffness of 600,000 lb/in in compression, an overall torsional stiffness of 77 (in-lb,/Deg.) and substantially equalized shear strains from layer-to-layer, thus assuring uniform deterioration under cyclic torsional motion. This is a marked improvement over bearings where each layer is made of the same stock, since in the latter case the shear strain distribution in each layer cannot be uniform within the usual test limits of 5% and 50% strain. Further, by way of comparison, a bearing having the same dimension as in the foregoing example but having the resilient layers made from fourteen different stocks varying progressively from a shear modulus of 70 psi for layer 10A to a shear modulus of 240 psi for layer 10E, will have almost the same compressional and torsional spring stiffness, but will have non-equalized shear strains under the same input conditions.

The invention may be practiced otherwise than as already described and illustrated. Thus, all instead of only some of the elastomer layers could be made in three sections, the layers could have varying thicknesses, the use of dams or bulge restrainers could be limited to a different number of resilient layers, and the number of resilient layers could be increased or decreased. The invention also may be applicable to bearings of other shapes. Thus, the bearing could be more nearly a full cone or it could be a spherical bearing as in the bearing shown in FIG. 6 of U.S. Pat. No. 4,105,266, issued 8/8/78 to Robert H. Finney or in U.S. Pat. Nos. 3,429,622, 3,941,433, 2,900,182 (FIG. 8) and 3,790,302 (FIG. 3, bearing unit 80), and the references cited therein.

In each case, however, the same advantages can be obtained, e.g., bearings of selected compressive and torsional load characteristics can be made using only three different stocks. Another advantage is that the invention allows the manufacture of bearings with more uniform shear strain distribution without loss of adequate control, thereby forestalling bearing failure as a result of extrusion and fretting erosion as the bearing undergoes repeated changes in loading. Additionally and equally important, it is possible to adjust the bearing torsional spring rate so as to reduce the power required to be exerted by a connected actuator or operator, e.g., an electric or hydraulic motor, thereby contributing to the lifetime and reliability of the actuator and/or allowing the use of a smaller actuator. Still other advantages and modifications will be obvious to persons skilled in the art.

What is claimed is:

1. In a laminated bearing comprising a plurality of alternating and bonded together layers of elastomeric material and substantially non-extensible material with the layers disposed about and alternating lengthwise of a common axis so as to permit the bearing to support compressional loads applied generally normal to the layers and torsional loads applied about said axis, each layer having with respect to said axis a radially inner circumference and a radially outer circumference, the improvement wherein at least two of said layers of elastomeric material are characterized by a first portion thereof at said inner circumference having a first relatively high nominal modulus of elasticity, a second portion thereof at said outer circumference having a second nominal modulus of elasticity smaller than said first modulus of elasticity, and a third portion thereof between said first and second portions having a third nominal modulus of elasticity less than said second nominal modulus of elasticity, the differences between said nominal moduli of elasticity being such that the shear strain distribution in each of said plurality of layers under compressive load is more uniform than the shear strain distribution in said each layer if said each layer were formed so as to have a constant nominal modulus of elasticity throughout, and each of said second portions having a modulus of elasticity sufficiently high for it to serve as a dam against bulging.

2. A bearing according to claim 1 wherein said layers of elastomeric material are frusto-conical.

3. A bearing according to claim 1 wherein all of said layers of elastomeric material have the same thickness.

4. A bearing according to claim 1 wherein all of said second portions have substantially the same size measured along a line running from the inner circumference edge to the outer circumference edge of each layer.

5. A bearing according to claim 4 wherein at least some of said first portions and third portions vary in size.

6. A bearing according to claim 5 wherein all of said layers of elastomeric material are frusto-conical and at least some of said third portions differ in size in accordance with differences in the outer circumferences of the layers which include said at least some third portions.

7. A bearing according to claim 1 wherein the last-in-line layer of elastomeric material is made up almost wholly of said first high modulus material and the first-in-line layer of elastomeric material consists of a relatively large third portion having said third modulus of elasticity and relatively small first and second portions having said first and second modulii of elasticity respectively.

8. A laminated bearing comprising a plurality of alternating and bonded together layers of elastomeric material and substantially non-extensible material disposed in alternating relationship about a common axis so as to permit the bearing to support compression loads applied generally normal to the layers and torsional loads applied about said axis, each layer having with respect to said axis a radially inner circumference and a radially outer circumference, at least one of said elastomeric layers being characterized by a first portion thereof at said inner circumference having a first relatively high nominal modulus of elasticity, a second portion thereof at said outer circumference having a second nominal modulus of elasticity smaller than said first nominal modulus of elasticity, and a third portion thereof extending between said first and second portions having a third nominal modulus of elasticity less than said second nominal modulus of elasticity, with said first, second and third sections coacting so that within the compressive load and torsional motion limits for which it is designed said bearing will have a more optimum balance of torsional spring rate and shear strain distribution than is possible if said at least one layer were formed so as to hve a constant nominal modulus of elasticity throughout.

* * * * *